A. T. KEENE.
HYDRAULIC POWER TRANSMISSION.
APPLICATION FILED JUNE 30, 1913.
1,172,802.
Patented Feb. 22, 1916.
7 SHEETS—SHEET 5.
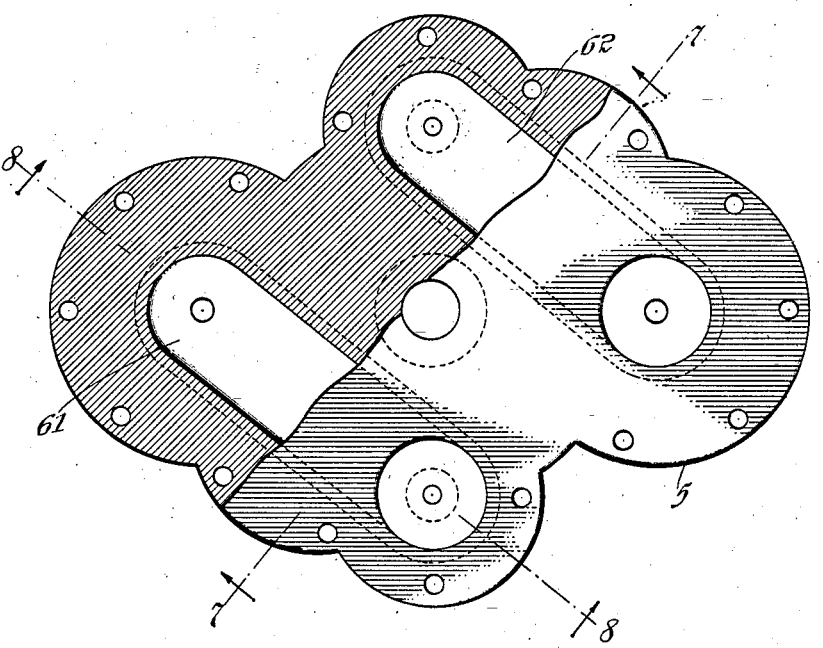
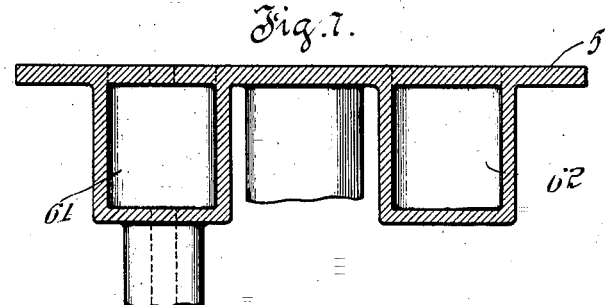
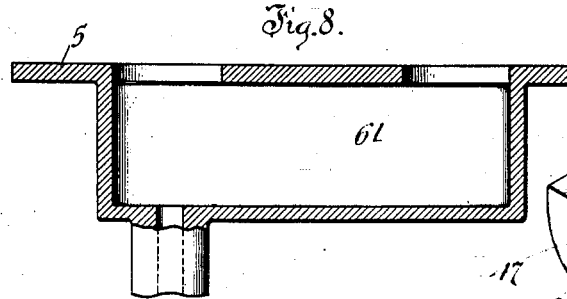
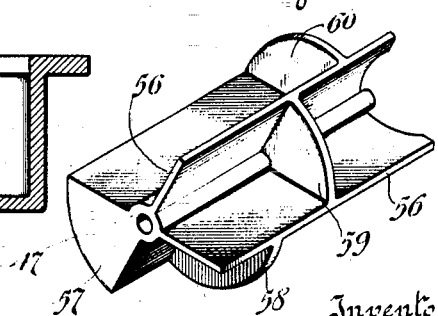
Inventor
Archibald T. Keene, A. T. KEENE.
HYDRAULIC POWER TRANSMISSION.
APPLICATION FILED JUNE 30, 1913.
1,172,802.
Patented Feb. 22, 1916.
7 SHEETS—SHEET 6.
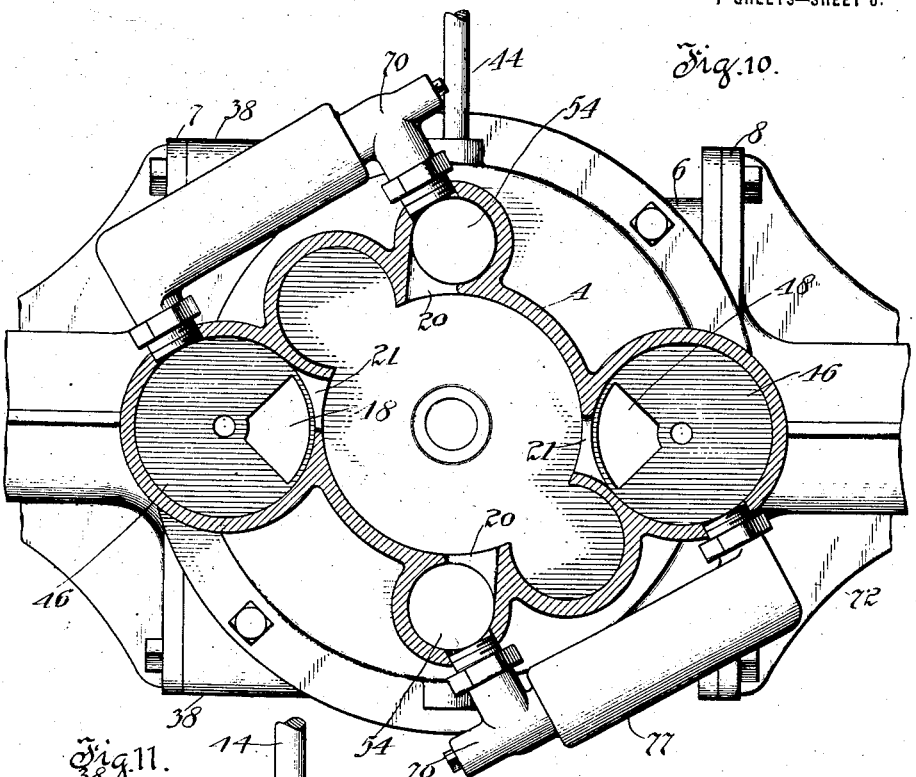
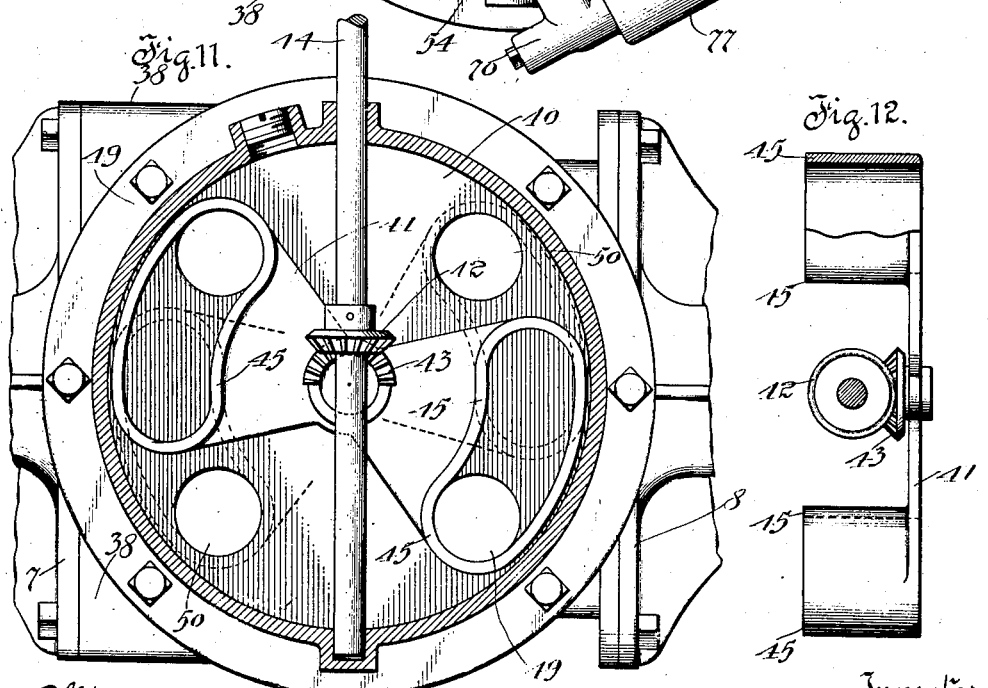
Witnesses
Arthur W. Carson
Maurice Goldberger
Inventor
Archibald T. Keene,
By George Bayard Jones
Atty.

UNITED STATES PATENT OFFICE.

ARCHIBALD T. KEENE, OF CHICAGO, ILLINOIS, ASSIGNOR, BY DIRECT AND MESNE ASSIGNMENTS, TO KEENE HYDRAULIC TRANSMISSION COMPANY, A CORPORATION OF ARIZONA.

HYDRAULIC POWER TRANSMISSION.

1,172,802.   Specification of Letters Patent.   Patented Feb. 22, 1916.

Application filed June 30, 1913. Serial No. 776,689.

*To all whom it may concern:*

Be it known that I, ARCHIBALD T. KEENE, a citizen of the United States, residing at Chicago, in the county of Cook and State of Illinois, have invented new and useful Improvements in Hydraulic Power Transmission, of which the following is a full, clear, concise, and exact description, reference being had to the accompanying drawings, forming a part of this specification.

My invention relates to improvements in hydraulic power transmissions.

The object of my invention, generally speaking, is to provide an improved device of this character which shall be more efficient than those constructed heretofore.

As contributory toward carrying out the main object, my invention has as further objects thereof; to provide a device in which pressure on the gears constituting the main elements of the pump, motor and valves is balanced to prevent unnecessary friction; to provide a construction permitting the ready introduction of the supply of circulating fluid without forming air pockets; to provide a device in which a rotary valve is compactly mounted between the pump and motors and serves to reverse the connections in a simple and efficient manner; to provide means for insuring rotation of the gears past dead center.

Various other objects will be apparent from the description hereinafter given.

In the accompanying drawings, I have illustrated one embodiment of the invention. Said invention is not limited to the present disclosure, however, as it may be embodied in other forms.

Figure 1:
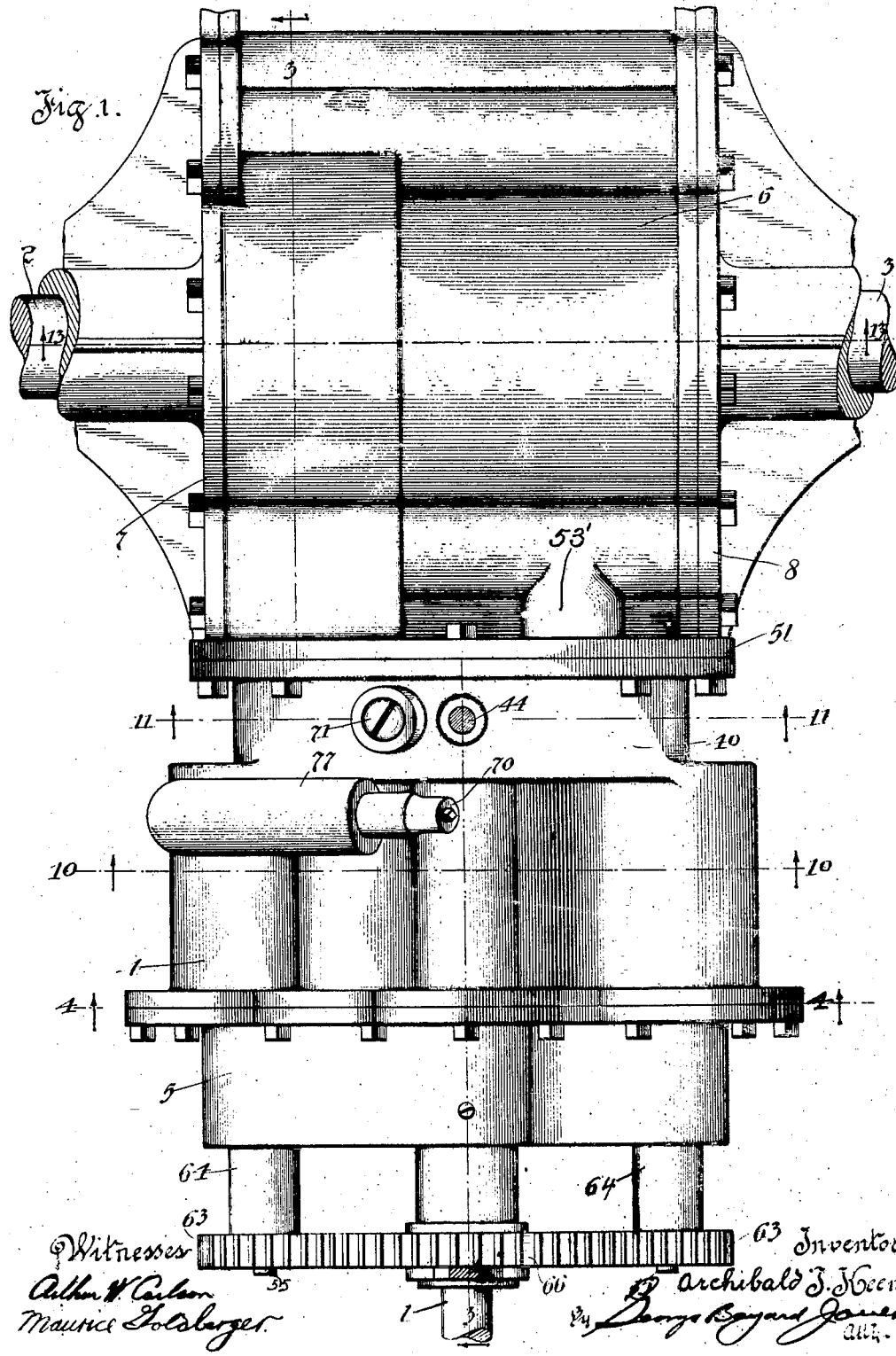
Figure 2:
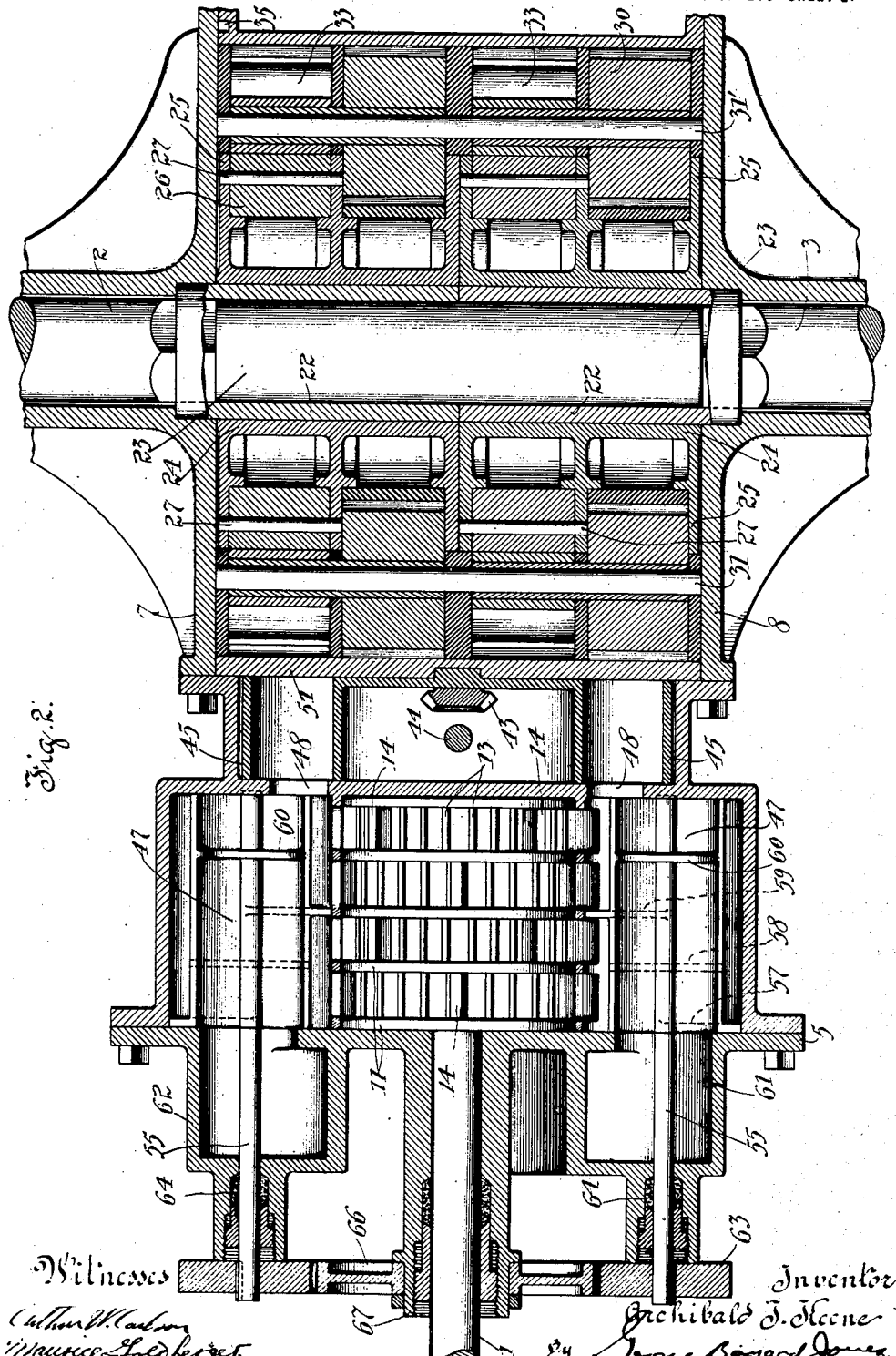
Figure 3:
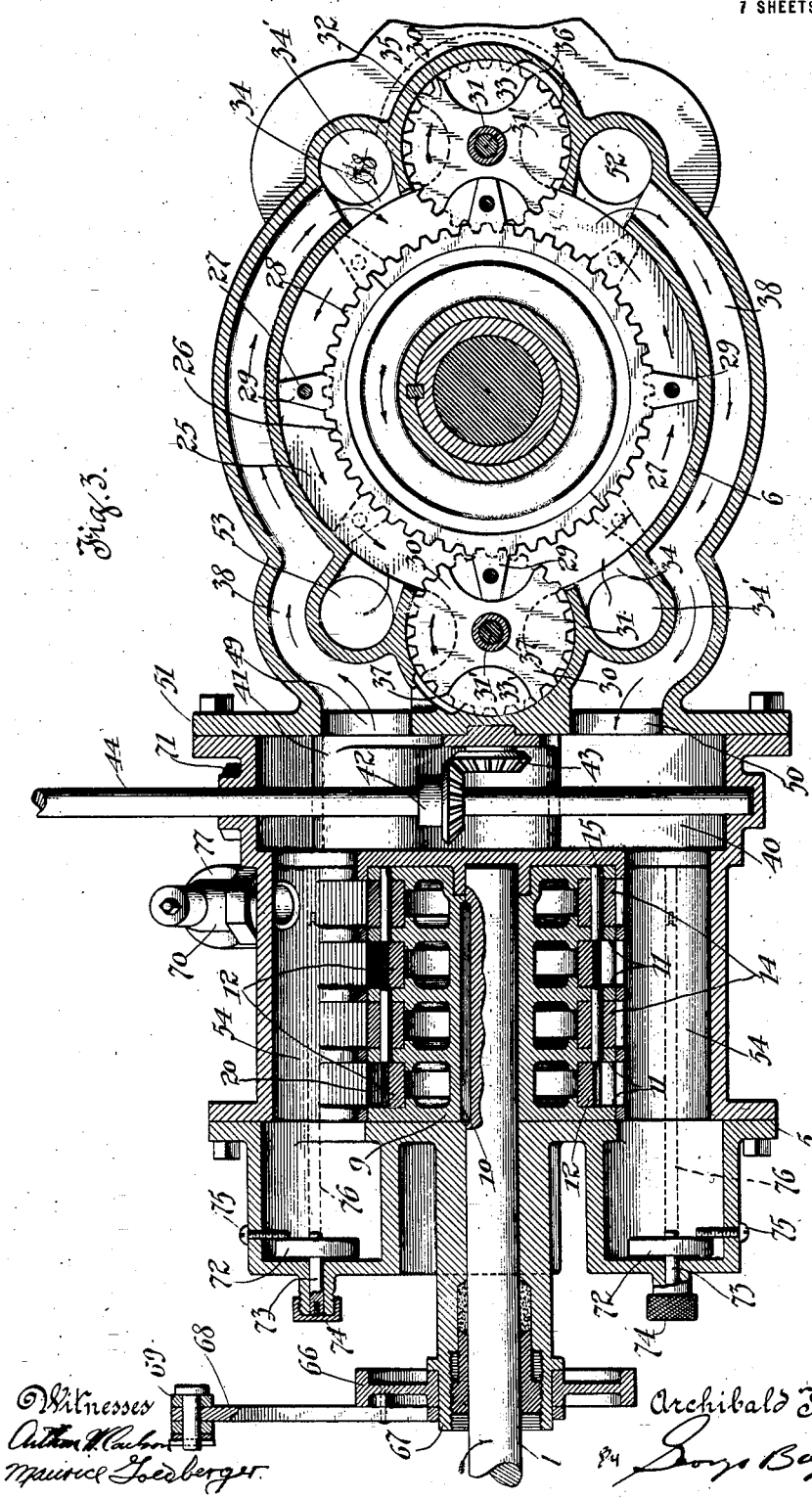
Figure 4:
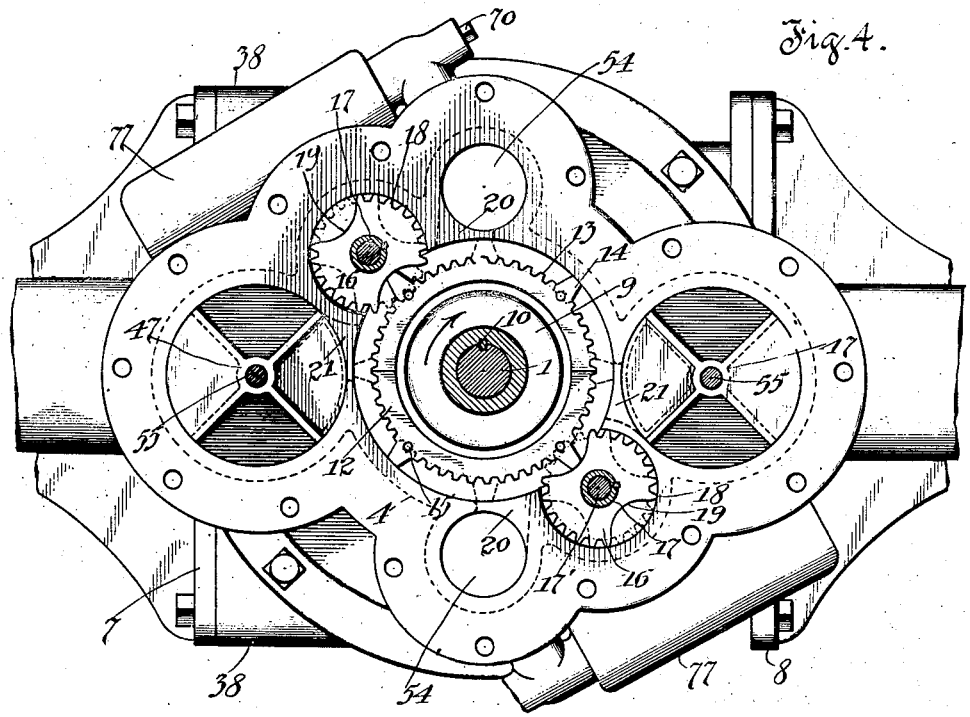
Figure 5:
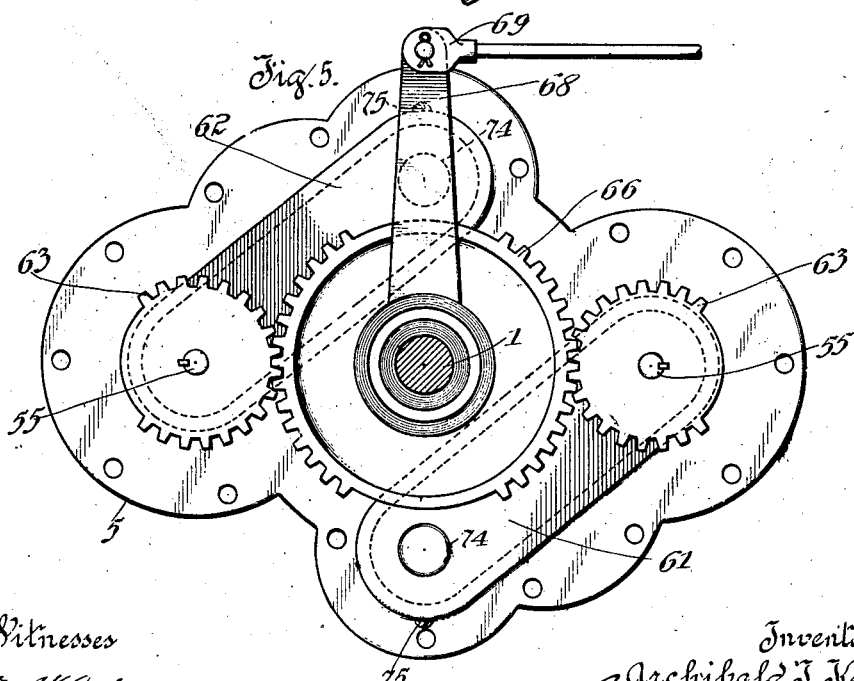
Figure 13:
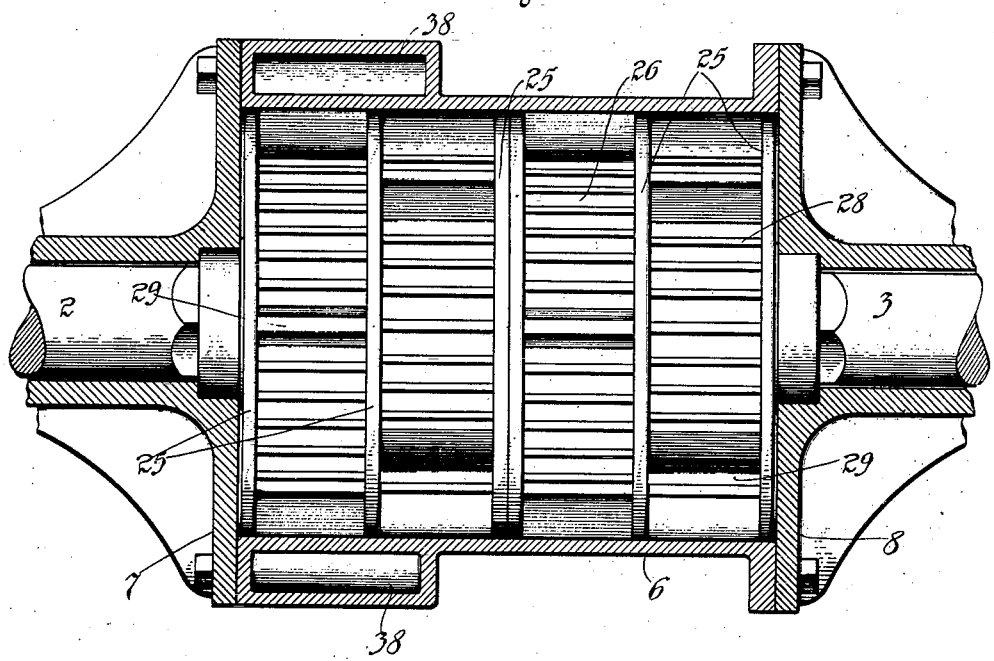
Figure 14:
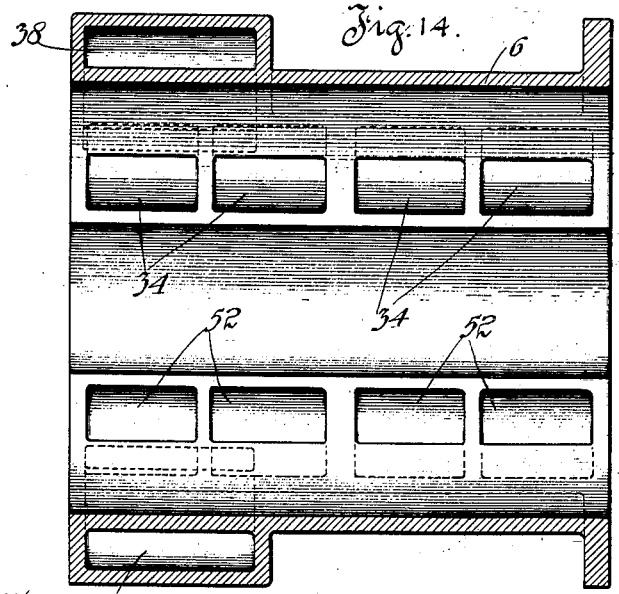

Figure 1 is a top plan view of the preferred construction; Fig. 2 is a central, horizontal, sectional view thereof; Fig. 3 is a vertical, sectional elevation on the line 3—3 of Fig. 1; Fig. 4 is an end elevation of the pump, the forward part of the casing being removed; Fig. 5 is an end elevation of said pump showing the variable speed control mechanism; Fig. 6 is an elevation partly in section of the end of the pump casing showing the by-pass arrangement; Fig. 7 is a section on the line 7—7 of Fig. 6; Fig. 8 is a section on the line 8—8 of Fig. 6; Fig. 9 is a perspective view of one of the valves controlling the flow from the discharge ports; Fig. 10 is a section on the line 10—10 of Fig. 1; Fig. 11 is a section on the line 11—11 of Fig. 1; Fig. 12 is a sectional elevation of the reverse valve; Fig. 13 is a sectional elevation on the line 13—13 of Fig. 1; and Fig. 14 is a similar view with certain parts removed.

The shaft 1 may be assumed to be driven directly by the engine of the automobile. The function of the mechanism, generally speaking, is to communicate motion from said shaft to the rear axle which, in the preferred construction, is made in two sections 2, 3 to permit a differential movement thereof; to allow a variable speed of said axle for a substantially constant speed of the engine and to permit considerable change or power ratio corresponding to the gear changes in the usual transmission. The mechanism comprises a pump which forces oil, or other fluid, into two motors arranged preferably side by side. These motors are similar to each other and each is arranged to drive one of the sections of said rear axle. The pump is inclosed in a suitable housing 4, having a front plate 5 of special configuration within which certain by-passes are arranged and having various adjuncts mounted on the forward side thereof. The motors are inclosed in a suitable housing 6 provided with reinforced side plates 7, 8, the various parts of the housing 4, 5, 6, 7, 8 being bolted together to form a compact, unitary construction, the component parts of which can be readily assembled and readily taken apart if necessary.

The pump comprises a casting 9 secured to the shaft 1 by the spline 10 so as to rotate therewith. It is provided with annular ribs or flanges 11 between which special gears 12 are arranged. I have illustrated five such ribs and four such gears, the latter being mounted in the grooves between the ribs, although, of course, the number of gears and ribs may be varied to meet different requirements. The gears 12 are provided with teeth 13 of ordinary construction which occupy all of the circumference except that each gear 12 is provided with four enlarged teeth 14 which may be termed pistons, although, of course, the number and size thereof may be varied, said pistons 14 being of such length that they are just flush with the outer periphery of the annular ribs 11, said ribs and pistons fitting closely within a circular bore arranged centrally with respect to the housing or casing 4. Said pistons and ribs fit snugly within said bore and turn freely as a unit therein, the extended wearing surfaces provided by the ribs as they rotate thus preventing excessive wear on said pistons 14 as the latter rotate. Accordingly a snug fit of said pistons within the bore is insured through long continued use, and leakage of oil and consequent loss of efficiency is thereby eliminated. Each gear 12 is made preferably in two equal parts in order that it may be assembled within the grooves between the ribs 11, said parts being thereafter held in position by pins 15 passing through openings in said pistons and in said ribs (see Figs. 3 and 4).

The four gears 12 turn as a unit, being, in effect, fixed to the shaft 1, whereby the rotation of any one gear insures the rotation of the remaining gears. Each of the gears 12 rotates in mesh with one or more smaller gears or pinions 16. In the present instance there are two such pinions for each gear 12, each half the size of said gear, although the number and relative dimensions thereof may, of course, be varied. These three gears—namely, the larger gear and the two small ones on opposite sides thereof—may be said to constitute a set or a pump section, the complete pump being made up of a plurality of such sections, two being the minimum number required. The four pinions 16 on one side of the large gears are arranged in alinement and turn about a common axis, said pinions being connected so as to turn preferably in pairs, whereby either pinion of the pair may drive the other. To permit this operation, each pair of pinions is mounted on a sleeve 17, which sleeve turns on the shaft 17'. This arrangement also provides ample bearing surface for the pinions. The four pinions on the opposite sides of the main gears are similarly mounted.

Each pinion 16 has the usual pinion teeth 18 meshing with the ordinary pinion teeth 13 on the gear 12. It is also provided with a cut-out portion 19 adapted to receive in close fitting relation the pistons 14, as shown in Fig. 4. In the present construction the gears 12 are arranged in staggered relation with respect to their pistons 14, the first and third gears being arranged in the same position as that shown in Fig. 4 and the second and fourth gears being arranged with their pistons 14 in intermediate position, as shown in dotted lines in said figure. The small gears 16 are also necessarily arranged in staggered relation to permit the pistons 14 to pass them freely and without binding during the rotation of the parts, said pistons being received within the cut-out portions 19.

When the large gear 12 has driven the small gear 16 to the position shown in full lines in Fig. 4, it will be seen that the gear teeth 13 of gear 12 are no longer in mesh with the gear teeth 18 of the pinion 16. However, the gear 12 immediately adjacent thereto is in mesh with its two pinions 16 at this time, and, inasmuch as the two large gears and the two sets of small gears turn as a unit, the continued rotation of the gears of the first mentioned set is insured. In other words, the continued rotation of the gears of any one set, passing what might be called the dead center, is insured by the gears of another set. This coöperation also insures that the teeth 13 and 18 on the gears of any one set will again be brought into accurate mesh after the pistons have passed the recesses. Each pump, to be a working unit therefore in accordance with the preferred construction described, must consist of at least one large gear 12 and one gear 16 with means for preventing the dead center effect and for insuring the accurate meshing of the teeth 13 and 18. Where two sets of gears are employed, each set may be made to perform this function for the other set. In the present construction there are four such sets, the construction being practically a duplicate of what would be required for a single working unit. It is to be understood, of course, that other means may be provided to perform the function of insuring continuous rotation of the gears of any one set. By causing the different sets to coöperate with each other in the manner described, however, I am enabled to eliminate auxiliary devices which would otherwise be required. The performance of the function just described is absolutely essential to the operation of the unit constructed as above described.

Each pump section is double-acting, oil being drawn into the inlet ports 20, 20, arranged on opposite sides of the large gear, as shown in Figs. 4 and 10. The direction of rotation being assumed to be that shown by the arrow in Fig. 4, it will be seen that the oil is confined in each case within a curved chamber and forced ahead on each side of gear 12 by one of the pistons 14, and thence forced through the outlets 21 from which it is forced to the motor, as hereinafter described. It will be noted that the oil is forced ahead by a positive piston action, and furthermore the friction is reduced to a minimum as the only surface over which the oil flows is the inner wall of the chamber. Said oil is prevented from escaping beyond the small gears 16 by virtue of the intermeshing of gears 12 and 16, the teeth 13 and 18 of which, in accurately constructed gears, have a rolling contact involving a very close fit, while the cut-out portions 19 also closely fit the pistons 14, when passing the latter, and furthermore, with said teeth and pistons submerged in oil, any slight clearance which might exist is effectually sealed by an oil film. Furthermore, the tendency of the oil to flow around the outer periphery of the smaller pinions is counter-acted in part by the fact that said pinions are moving in a direction opposed to the escape of the oil, in addition to which said small pinions fit snugly within their circular chambers and are furthermore sealed by an oil film.

In Fig. 4 it will be seen that oil is being pumped simultaneously from the upper side of the large gear 12 downwardly and toward the right and from the lower side thereof upwardly toward the left. Hence, the pump is double acting. Furthermore, the large gear 12 is balanced due to the fact that the pressure of the oil on opposite sides thereof is equal.

Before describing further the valves and the various other adjuncts of the pump, I will describe the motors as the latter are similar to each other and to said pumps as to their main features.

As previously stated, there is a separate motor for driving each half of the rear axle. The sections 2, 3 of said axle are removably secured to cylindrical members 22, 22, said sections having squared ends, whereby they may turn with said cylindrical elements. A short shaft 23 fits within said cylindrical members to provide further support therefor. The members 22, 22 are keyed to castings 24, 24 which are similar to each other and each of which is provided with flanges or ribs 25 similar to those previously described, between which gears 26 are located, being secured thereto by pins 27. Each gear 26 is provided with small teeth 28 and four large teeth 29 through which said pins pass. Each motor comprises preferably two such gears arranged in the same staggered relation previously explained. Said gears are each provided with two small pinions 30 secured to sleeves 31 on shafts 31', and having pinion teeth 32 and recesses 33, all of which coöperate in the manner hereinbefore described. A pair of oil inlets 34 are provided at opposite sides of the large gears, the oil entering through said inlets from chambers 34' and rotating the gears in the direction indicated by the arrow in Fig. 3, the large teeth 29 acting as pistons, as previously described, excepting that the general operation is reversed, the oil driving the pistons instead of vice versa. The back pressure of said oil is resisted by the smaller pinion 30 and leakage is prevented for the same reasons previously set out. Furthermore, the large gears are balanced. The smaller pinions may also be balanced where it is desired to reduce the wear due to the side pressure of said sleeves 31 on their supporting shafts. I have shown in Fig. 3 a construction permitting such balancing of the small pinions and consisting, in the case of the right hand pinion, of a by-pass 35, whereby the oil is conducted around to the opposite side of the small pinion and admitted to contact with a small portion thereof through the port 36. The area of this port is substantially equal to the area of the pinion on the opposite side against which the back pressure is directed, and, said areas being diametrically opposed, the pinion is substantially balanced. The by-pass is readily provided in the form of a channel in the face of the housing 6, said channel being closed by the end plate 7. The port 36 is in the form of an elongated groove extending from said channel 35 past all of the gears constituting the two motors. The balancing of the left hand pinion or forward pinion is accomplished by providing a port 37, whereby the oil which is being pumped through the upper passage or port 38, as hereinafter described, is admitted directly to said pinions. There are two passages 38, as hereinafter explained, a lower and an upper passage, the upper passage, however, being the only one communicating with the small pinions in the manner described. It is apparent, of course, that the pump may also have its small pinions balanced in the same manner, if desired.

Referring now to the manner in which the oil is directed from the pump to the two motors, it will be seen that the rear of the casing section 4 incloses a chamber 40 within which is arranged a valve 41 (see also Figs. 11 and 12). Said valve comprises a pivotally supported member adapted to be rotated back and forth by suitable bevel gears 42 and 43 in conjunction with a shaft 44 carrying one of said gears. Said pivoted member carries at opposite sides, a partition or wall 45 of sufficient height to fill the chamber, although freely rotatable back and forth therein, as will be apparent from Fig. 3.

When the pivoted member 41 is in the position shown in Fig. 11, the oil will flow from the pump to the motors in such a direction as to move the latter in a forward direction. When said member is moved to the dotted line position, however, the motors are reversed. If said member is moved to mid-position, the oil is simply by-passed and the motors do not operate at all. When said members move to various intermediate positions, varying portions of the oil may be by-passed, whereby variable speeds may be obtained either forward or reverse.

This reverse feature will be apparent from a consideration of Figs. 3 and 11. In Fig. 10 it will be seen that the oil after leaving the pump through the ports 21, flows into the chambers 46, being directed therethrough by the valves 47 (see Figs. 2, 4 and 9), as hereinafter described, said oil flowing to the rear, under normal conditions, and through the openings 48, 48, whereupon it is guided by the inclosure formed by walls 45 to either or both of two ports 49 or 50 in the front wall 51 of the casting section 6. With the valve in the position shown in Fig. 11, the oil is guided through the openings 49 into suitable chambers to the rear thereof. One of these chambers is shown in the upper part of Fig. 3, the oil flowing in the direction indicated by the arrow into the upper passageway 38 previously described, and thence to the motors. The oil flows through the other port 49 to the forward inlet port 34 previously described, and then through the lower part of the motor to the ports 52 and outlet 52', returning through lower passage 38 to the lower port 50 (Fig. 11). The rest of the oil, after passing to the upper part of the motor, as shown in Fig. 3, flows through the outlet 53, which latter is in communication with the upper right hand opening 50 in Fig. 11. The exterior wall 53' of the short passage leading from port 50 to said transverse passage 53 is seen in Fig. 1. A similar short extension of the lower port 49 leading to the forward transverse passage 34' is found on the lower side of the transmission, directly below the upper one (but not shown). Accordingly the chamber 40 is filled with the oil returning from the motor, excepting in so far, of course, as a portion of the space therein is occupied by the valve 41. The returning oil is thereupon free to enter the upper and lower chambers 54 from which it may be drawn through the inlet ports to the pump.

Under normal circumstances the entire volume of oil circulates from the pump to the motors and returns to the pump, as just described. Where it is desired to increase the power or decrease the speed, however, the valves 47 are turned so as to by-pass the oil pumped by certain of the gears 12. Said gears are thereby rendered ineffective. This amounts to decreasing the piston area of the pump as a whole, while the piston area of the motors remain constant. The result is that the power is increased in proportion to the ratio of the pump pistons with respect to the motor pistons in accordance with well known principles.

Each of the valves 47 is mounted on a shaft 55 so as to turn therewith. Each valve comprises, in the preferred construction, four radially arranged vanes 56 connected by webs 57, 58, 59, 60 arranged at successively increasing distances from the end of said valve and so disposed as to be in alinement with the various ribs 11 on the pump casting 9, as shown, for example, in Fig. 2. The valves are normally in such position that communication from the chamber 46 within which they are located to the by-pass chambers or channels 61, 62 are obstructed by the webs 57, whereby the oil being pumped from any or all of the four gears 12 is forced to travel to the rear within said chamber and out through the openings 48 in the rear wall thereof, as heretofore described. If said valve is rotated a quarter turn, the web 58 is brought into alinement with one of the ribs 11, whereby the oil of the three right hand gears is pumped to the rear, whereas the oil from the left hand gear flows in a forward direction into the by-pass chambers. In like manner, if the valve is turned to the third position only two of the gears are effective for pumping the oil to the motors. If it is turned to the fourth position, only the rear gear is effective. This manipulation of the valve gives four power variations, whereby the automobile may climb grades or haul increased loads, or in other ways exert more power, the effect being analogous to changing from a high gear to a low gear. In Fig. 2, the valves are set so that the two rear gears only, are effective. The oil from the two front gears flows through the forward part of the respective chambers 46, 46, into the by-pass recesses 61, 62, and, as seen in Figs. 5 and 6, flows along a diagonal path to the upper and lower inlet chambers 54 (Fig. 4), whereby it is again pumped around these two closed circuits without doing any effective work and without developing any appreciable friction. In order to rotate both valves simultaneously, I provide a pair of gears 63, each fixed to their respective shafts 55, said shafts passing through suitable stuffing boxes 64 adjacent to said gears. These gears mesh with a large gear 66, the latter being mounted on a suitable sleeve 67, and having a hub to which is secured a lever 68 which may be manipulated by a link 69 or some other suitable device to rock the gear 66 back and forth and thereby simultaneously turn the two valves 47, 47.

After the device is assembled, oil is admitted through the supply nipples 70, whereby, as the pump is rotated, the oil will be caused to circulate in the desired manner and eventually fill all of the chambers, thereby driving out the air. An outlet 71 is provided leading from the top of the chamber 40, whereby when the chambers are entirely filled with oil, the fact will be indicated by the overflow at said outlet. The oil may be introduced preferably by exerting a suction on said outlet, thereby drawing it from the inlet through all of the various chambers and at the same time drawing out the air which might otherwise become pocketed in the various recesses.

In order to introduce the oil into the device, it is desirable to close communication between the inlet chambers 54 and the chamber 40. Accordingly I provide for this purpose pistons 72 (see Fig. 3), said pistons being mounted on short shafts 73, the latter having detachably secured thereto suitable knurled caps 74. In order to make use of said pistons, the caps are unscrewed therefrom and a stem 76 is connected thereto, as indicated in dotted lines in said figure. In order to assist in making this attachment, I provide suitable means such as screws 75 for holding the pistons in place during the operation. Said screws are, of course, removed after the attachment of the rod 76, whereby said pistons may be moved rearwardly to the dotted line position in Fig. 3, whereby communication is cut off between the above mentioned chambers. With this arrangement, the oil which is being introduced through the nipple 70 enters the pump directly and the oil, after completing the circuit through the various chambers, fills the chamber 40 without being able to communicate with the portion of the oil entering the pump.

A suitable cross connection or pipe 77 may be provided from each chamber 46 to the corresponding inlet chamber 54 and safety valves of any suitable kind (not shown) located therein, whereby the pressure of the oil leaving the pump is prevented from exceeding certain predetermined limits. If the desired predetermined pressure is reached, said valves will permit a short circuit of oil directly across from the outlet to the inlet ports of the pump.

It is to be understood, of course, that the mechanism above described has been selected merely for the purpose of illustrating the main features of the invention, and accordingly the invention is not to be limited to said mechanism except where limitations appear in the appended claims. Accordingly I desire to cover in said claims whatever other embodiments of the invention may be devised which fall within the scope thereof.

Having thus described my invention, what I claim as new and desire to secure by Letters Patent of the United States is:—

1. In a device of the class described, a rotor having a circumferential groove and a gear received within said groove, said gear being formed in two separable parts and having teeth flush with the outer surface of said rotor.

2. In a device of the class described, a rotor having a plurality of circumferential grooves, a gear located in each of said grooves, each gear being made in separable sections and having a plurality of enlarged teeth with interposed small teeth said large teeth being flush with the outer surface of said rotor.

3. In combination, a plurality of individually balanced pump sections, a pair of pressure chambers on opposite sides thereof, a valve in each of said chambers, and means for simultaneously operating the said valves to by-pass the fluid from one or more of said pump sections, whereby said pump remains balanced regardless of the number of sections in use.

4. A hydraulic transmission comprising a plurality of intercommunicating chambers, one of said chambers having an opening therein to permit the introduction of a supply of fluid, another of said chambers having an opening therein constituting an outlet for said fluid, and means for temporarily shutting off direct communication between said two chambers.

5. In a hydraulic transmission, a series of communicating chambers providing a closed cycle for the flow of fluid, a pair of openings communicating with certain of said chambers, and means for temporarily obstructing the possible flow of fluid between the points with which said openings communicate.

6. In a hydraulic transmission, a pump or motor having a power wheel, a valve wheel associated therewith and constituting the end of a working chamber, a recess opposite said working chamber in the wall surrounding said valve wheel and means to connect said recess to the fluid pressure to equalize the pressure on said valve wheel.

7. In a hydraulic transmission, in combination, a pump, a plurality of inlet and outlet passages in the pump, a plurality of by-passes in the pump head each connecting an inlet passage with an outlet passage, and means to direct equal variable portions of fluid through said by-passes whereby said pump remains balanced under all operating conditions.

8. In a hydraulic transmission, in combination, a pump, a motor, a chamber having a wall of the pump forming one side thereof and a wall of the motor forming the other side thereof, a plurality of fluid passages in the pump and motor communicating with the chamber and a rotatable valve located in said chamber and having oppositely extending wings constituting connecting channels between the passages of said pump and motor and means for rotating said valve to reverse the relative connections between said pump and motor.

9. In a hydraulic transmission, in combination, a pump, a motor, a chamber having a wall of the pump forming one side thereof and a wall of the motor forming the other side thereof, a plurality of fluid passages in the pump and motor communicating with the chamber and a movable valve located in said chamber and having oppositely extending wings, each wing having a wall constituting a connecting channel between certain passages of said pump and motor, and means for moving said valve to reverse the relative connections between said pump and motor.

In witness whereof, I have hereunto subscribed my name in the presence of two witnesses.

ARCHIBALD T. KEENE.

Witnesses:
 ALFRED H. MOORE,
 LESTER C. BARTON.